Jan. 25, 1949.   J. W. DAWSON   2,459,796
WELDING SYSTEM
Filed June 21, 1945   3 Sheets-Sheet 2

INVENTOR.
JOHN W. DAWSON.
BY Elmer J. Gorn
ATTORNEY

Jan. 25, 1949.   J. W. DAWSON   2,459,796
WELDING SYSTEM
Filed June 21, 1945   3 Sheets-Sheet 3
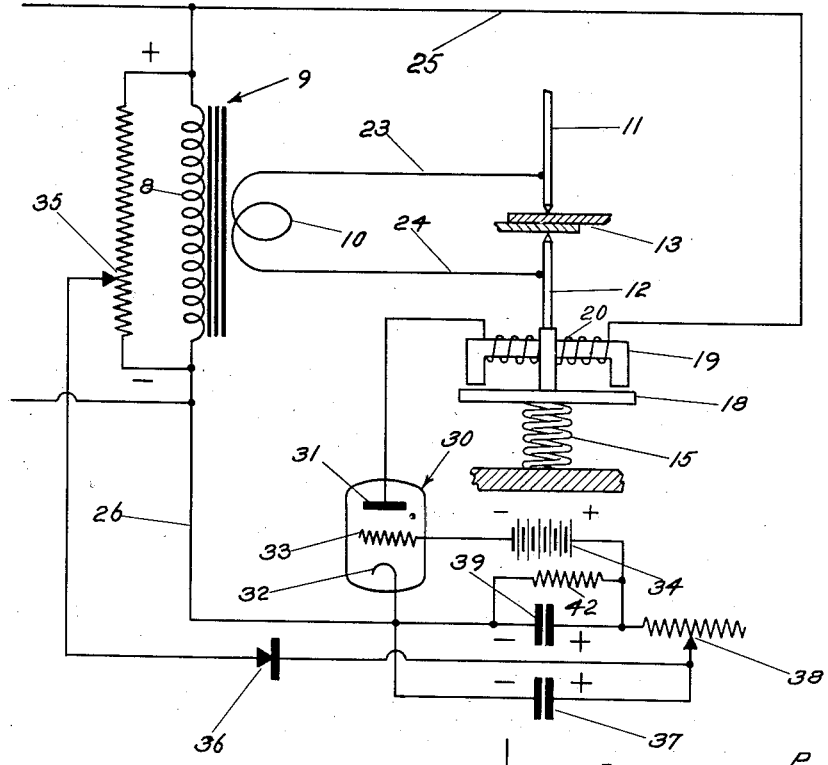
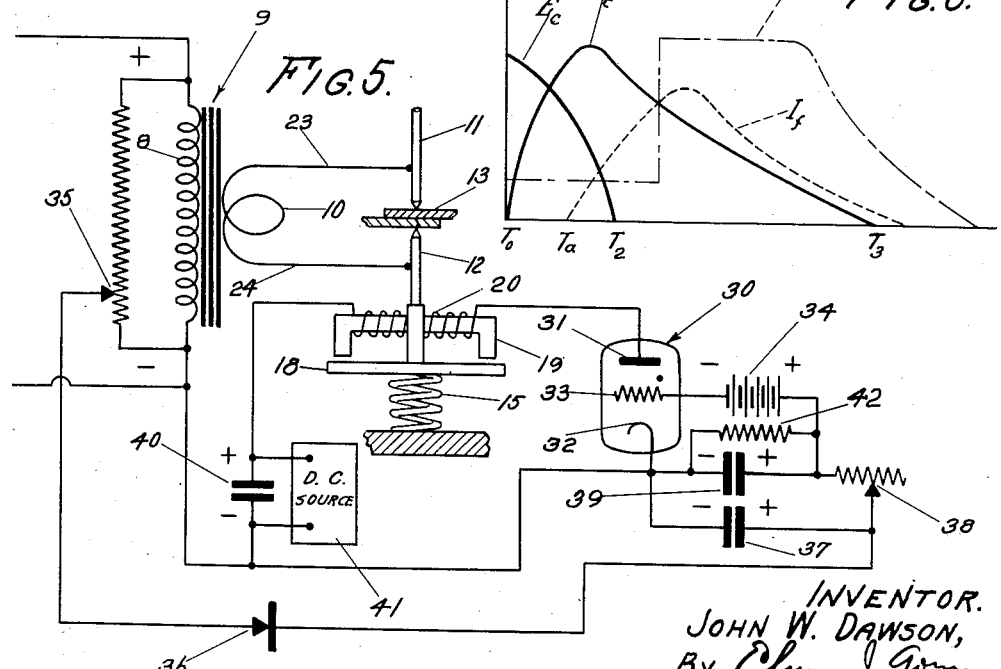
INVENTOR.
JOHN W. DAWSON,
By
ATTY.

Patented Jan. 25, 1949

2,459,796

UNITED STATES PATENT OFFICE 2,459,796

WELDING SYSTEM

John W. Dawson, West Newton, Mass., assignor to Raytheon Manufacturing Company, Newton, Mass., a corporation of Delaware Application June 21, 1945, Serial No. 600,727

3 Claims. (Cl. 219—4)

This invention relates to resistance welding, and particularly to resistance spot welding systems of the type in which a high voltage impulse of current is supplied to the work for effecting a resistance spot weld.

In welding systems of the type to which the invention relates, it is desirable to supply a portion of the welding energy in the form of a unidirectional impulse of high voltage current, while the work pieces are held together under relatively light contact pressure, and thereafter to apply a much higher forging pressure while continuing the supply of welding current at a lower energy level.

It is among the objects of my present invention to provide a welding system for effecting the mode of operation described in the foregoing in a simple and effective construction, and without increasing the number of tubes necessary to control the current flow or otherwise materially complicating the electrical system.

It is a further object of the invention to provide a system of the type described in which the forging pressure is supplied to the work by magnetic energy derived from or controlled by the welding current.

It is a further object of the invention to provide a welding system in which the timing of the application of the forging pressure to the work may be varied over wide limits relative to the initiation of the welding current impulse.

The above and other objects and features of the invention will be made fully apparent to those skilled in the art from a consideration of the following detailed description taken in conjunction with the accompanying drawings in which:

Fig. 4 is a wiring diagram showing a modification of a portion of the circuit shown in Fig. 1;

Fig. 5 is a wiring diagram showing a further modification; and

Fig. 6 is a set of curves illustrating, in a qualitative manner, certain operating characteristics of the forms of the invention shown in Figs. 5 and 6.

Figure 1:
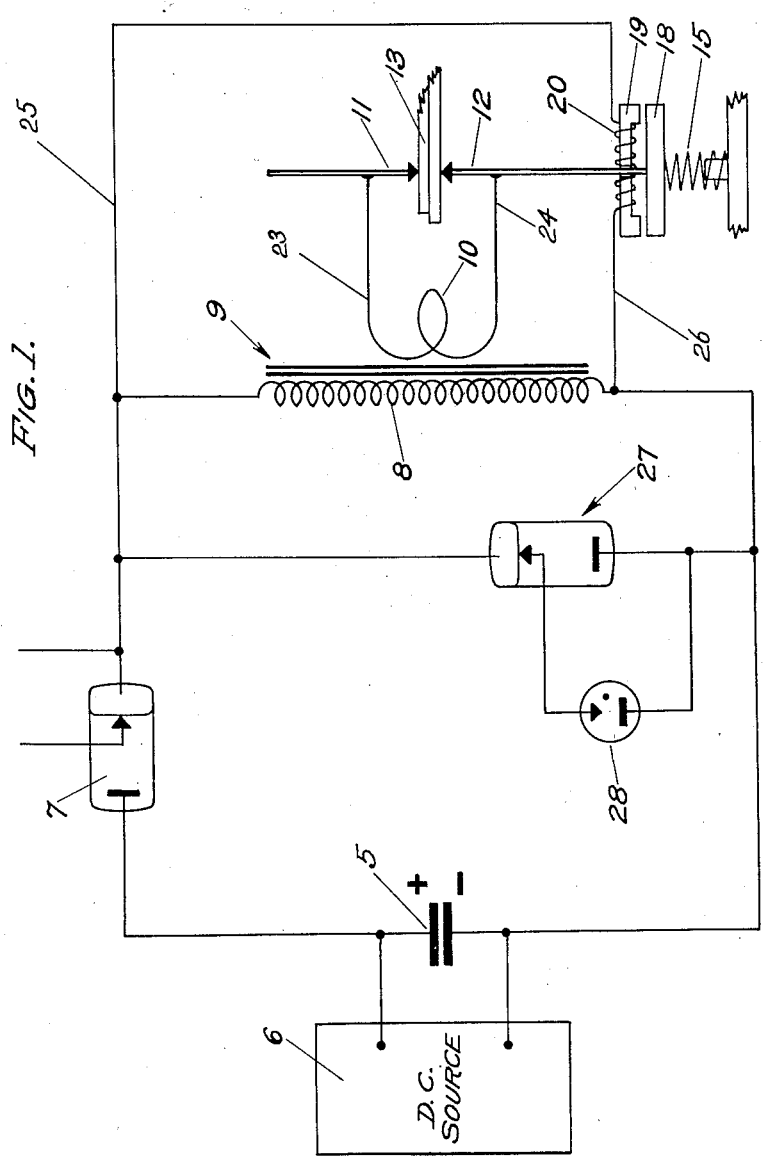
Fig. 1 is a wiring diagram of a welding system constructed in accordance with the present invention.
Figure 2:
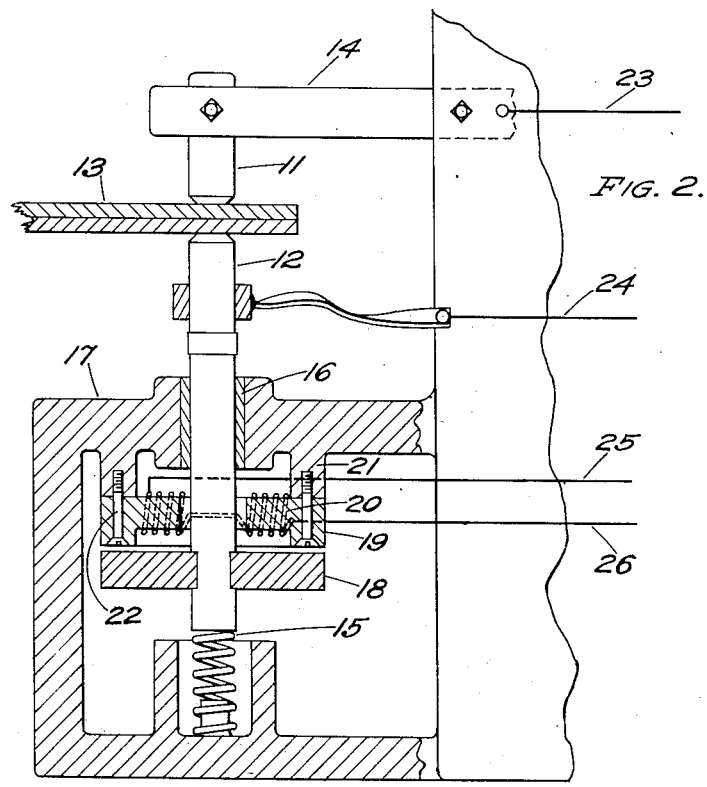
Fig. 2 is a longitudinal section, with parts in side elevation showing the welding electrodes and the mechanism for operating the same.

Referring to the drawings, and first to Figs. 1 and 2 thereof, reference numeral 5 indicates a storage condenser or a battery of such condensers. The condenser 5 is charged from a suitable source of direct current 6, such, for example, as a rectifier, and is discharged through a circuit including a controlled gaseous discharge device 7, such as an ignitron, and the primary winding 8 of a welding transformer 9. The welding transformer 9 has its secondary winding 10 connected to the electrodes 11 and 12 adapted to engage the work 13. As shown in Fig. 2, one of the electrodes, in this instance 11, is mounted for movement toward and away from the work 13 by means of a lever 14, to permit the insertion of the work between the electrodes or the movement of this work to different positions for successive spot welds. The other electrode 12 is biased into contact with the work 13 by a spring 15. It will be understood that the lever 14 is movable into a fixed position at which time the work 13 will be held between the electrodes 11 and 12 by a light contacting pressure determined by the strength of the spring 15. The electrode 12 is movable for short distances in a longitudinal direction, being guided by a bushing 16 provided in an opening in a housing 17, which housing is of non-magnetic material. Fixed to the electrode 12, adjacent to the lower end thereof, is an armature 18 having its outer ends positioned close to the two pole pieces of an electromagnet 19 having a coil 20. The electromagnet 19 is supported by an abutment 21 projecting inwardly from the housing 17, to which the magnet may be attached by means of screws 22. The electrodes 11 and 12 are connected by lead lines 23 and 24 to the opposite ends of the secondary winding 10 of the welding transformer 9. The coil 20 of the electromagnet 19 is connected by lead lines 25 and 26 across the primary winding 8 of the welding transformer.

In the operation of the system, assuming that the condenser 5 has been charged to a predetermined value from the source 6, and the electrodes 11 and 12 have been closed upon the work 13 so that the work is under the light contact pressure applied by the spring 15, the tube 7 is fired in a known manner by supplying an energizing impulse to the control electrode or to the resistance-immersion igniter thereof so that the tube 7 becomes conductive, and the condenser 5 is discharged through the primary winding 8 of the transformer 9. It will be understood that the supply of the energizing impulse to the gaseous discharge device 7 may be made dependent upon the closure of the electrodes 11 and 12 upon the work, or may be controlled by the operator after such closure.

Figure 3:
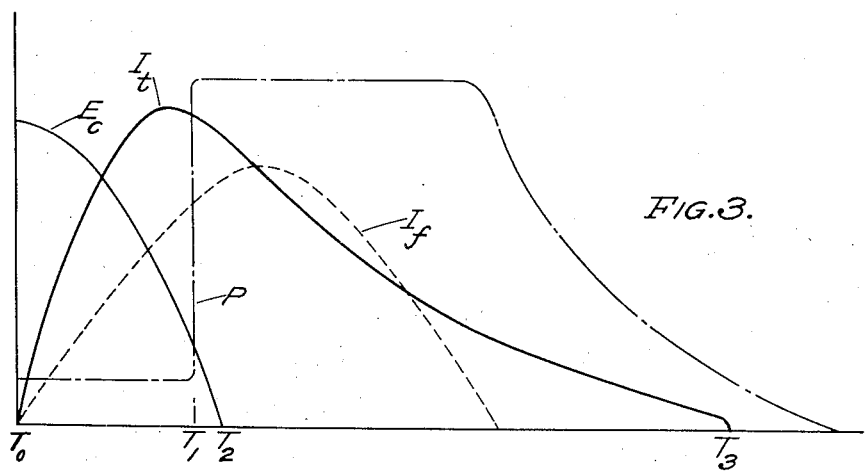
Fig. 3 is a set of curves illustrating in a qualitative manner certain operating characteristics of the system shown in the preceding figures.

The operation of the system may be more fully understood by reference to Fig. 3 which illustrates in a general qualitative way the variation with time of the charge on the condenser $E_c$, the welding current $I_t$, the pressure P applied to the electrodes 11 and 12, and the current $I_f$ to the coil 20 of the electromagnet 19. As the charge on the condenser $E_c$ approaches zero, the current $I_t$ reaches a maximum value while the pressure P applied to the work is still relatively low. Thus the peak of the current impulse is supplied to the work while the resistance therethrough is high, due to the light contact between the adjacent surfaces of the work pieces. This permits the explosion outwardly from the areas directly between the two work pieces of any surface film or oxidized layer or of any irregularities in such surfaces which may be present to a microscopic extent even though they appear smooth to the naked eye.

Simultaneous with the flow of current to the welding transformer, a current $I_f$ flows through the coil 20 of the electromagnet 19. This current rises more gradually than the current $I_t$ due to the greater impedance offered by the circuit including the magnet 19. The current $I_f$ is proportionate to a magnetic force tending to accelerate the armature 18 and force the electrode 12 in the direction of the work 13. Due to the inertia of the moving parts, this force does not immediately actuate the electrode 12. However, at a time $T_1$ after the current $I_t$ has reached or passed its peak, the force becomes sufficient to overcome the inertia of the mass of the movable parts and accelerate the armature 18 in the direction of the electromagnet 19, thereby applying a sharply increased pressure upon the work. The sharply increased pressure indicated by the almost vertical portion of the curve P is due to the fact that once the inertia of the mass of movable parts has been overcome, the force applied increases sharply as the armature 18 approaches more and more closely to the pole pieces of the electromagnet 19. It will be understood that the distance between the armature 18 and the electromagnet 19 is very small, this distance having been exaggerated in the drawing for purposes of illustration.

At the time $T_2$, when the charge on the condenser has fallen to zero, a considerable amount of energy has been stored in the welding circuit, including the transformer 9. This energy tends to maintain the current through the welding circuit in the original direction, and the polarity upon the condenser 5 tends to reverse. In order to prevent the recharging of the condenser 5 in an inverse direction and to permit the energy stored in the welding circuit to decay substantially exponentially, I provide a shunt circuit across the primary winding 8 of the transformer 9, which shunt circuit includes a gaseous discharge device 27. In the instance shown, the discharge device 27 is of the same type as the series tube 7, having its anode connected to the normally negative side of the condenser 5 and its mercury pool type cathode connected to the cathode side of the tube 7. In order to fire the tube 27, the anode of a rectifier tube 28 is connected to the anode circuit of the tube 27, and the cathode of the rectifier tube is connected to the resistance-immersion ignitor or other control electrode of the tube 27. As the potential across the condenser 5 reverses, the potential applied across the tube 28 is in the direction of which this tube is conductive, and an igniting impulse is applied to the tube 27. The tube 27 becomes conductive to permit the energy stored in the welding load circuit to decay substantially exponentially so a large portion of the welding energy is applied to the work from the time $T_1$ to the time $T_3$ after the welding impulse has passed its peak and while the high forging pressure is applied to the work.

It will be understood that the total time from $T_0$ to $T_3$ required for the welding operation is very short. This time, for example, may be but from five to twenty-five milliseconds.

In some instances it is desirable to provide a longer delay between the instant that the welding current is initiated and the application of the forging pressure. Also it is desirable to control the delay period in order that the forging pressure may be applied at the most desirable time after the initiation of the welding current for any given kind of work. In the form of the invention shown in Fig. 1, it is possible to obtain a delayed forge, since the inductance of the electromagnet is high and will not develop high current and therefore force until after the welding current impulse. Such delay may be prolonged and the duration of the delay controlled by providing a controlled discharge tube in one or the other of the lead lines 25 or 26 between the primary winding 8 of the transformer and the coil 20 of the electromagnet 19.

Such a construction is shown in Fig. 4, in which the same reference numerals indicate the same portions of the system illustrated in Fig. 1. Referring to this figure, reference numeral 30 indicates a controlled gaseous discharge tube having its anode 31 connected to the normally positive side of the primary winding 8 through the coil 20 of the electromagnet 19, and its cathode 32 connected to the normally negative side of the primary winding. The tube 30 is provided with a control grid 33 on which a blocking potential is normally maintained by battery 34. In order to control the instant at which the tube 30 is unblocked I provide a potentiometer 35, across the primary winding 8 of transformer 9, the adjustable arm of which potentiometer is connected through a rectifier 36 to one terminal of a condenser 37. The same terminal of the condenser 37 is connected through an adjustable resistor 38 to a second condenser 39 and also to the grid 33 through battery 34. The other side of the condenser 37 is connected to the lead between the cathode 32 of the tube 30 and the normally negative side of coil 8.

In the operation of this form of the invention, when a welding impulse flows through the primary winding 8 of the transformer 9, the adjustable tap of the potentiometer 35 is positive relative to the lower end of the coil 8. This potential is applied across condenser 37, and a charge is trapped upon the condenser 37 by the rectifier 36. The charge on the condenser 37 is gradually fed to the condenser 39 through the adjustable resistor 38. As soon as the charge on the condenser 39 has built up to a predetermined value, sufficient to offset the negative bias applied to the grid 33 by the battery 34, the tube 30 is unblocked and the full value of the potential across the primary winding 8 is applied to the coil 20 of the electromagnet 19. The current through the coil 20 rises gradually until the magnetic force is sufficient to actuate the armature 18 and apply the forging pressure to the work.

In this form of the invention, the current $I_f$ through the coil 20 is not initiated at the same time, $T_0$, as the initiation of the welding current It, but at a later time, such as $T_a$, as shown in Fig. 6. Accordingly, the abrupt increase in the pressure P applied to the work occurs later in the welding cycle than in the form previously described. It will be understood that the time $T_a$ may be varied, within limits, by altering the value of the resistor 38, so that the current $I_f$ through the coil 20 may begin at any time after $T_0$ but before the time $T_2$ when the voltage $E_c$ applied by the condenser 5 across the primary winding 8 of transformer 9 has fallen to zero. In other words, the tube 30 may be fired to permit the flow of current to the coil 20 of the electromagnet 19 at any time after $T_0$, as long as there is still a sufficient potential applied across the primary winding 8.

In order to permit the charge on the condensers 37 and 39 to leak off, after the same has performed the function of unblocking the tube 30, I provide a resistor 42 across the condenser 39. This resistor is of sufficiently high resistance to permit the charge on the condenser 39 to effect the unblocking of the tube 30, and sufficiently low to permit the charge to leak off during the relatively long period of time between the unblocking of the tube 30 and the next succeeding welding operation.

Where it is desired to provide a system in which a still wider range of variation in the application of the forging of pressure relative to the welding current may be obtained, the energizing current for the coil 20 of the electromagnet 19 may be supplied independently of the voltage across the primary winding 8 of the transformer. Such a system is shown in Fig. 5, in which a condenser 40, which may be charged from the source 6 or from an independent source 41, is utilized to energize the coil of the electromagnet 19. In this case, the opposite terminals of the condenser 40 are connected to the opposite ends of the coil 20 through the controlled gaseous discharge tube 30. The unblocking of the gaseous discharge tube 30 is controlled by the same time delay circuit previously described in conjunction with Fig. 4. The setting of the resistor 38 may now be made such that the unblocking of the tube 30 occurs at any time during the welding cycle either before or after the time $T_2$ when the potential across the primary 8 falls to zero. This is possible since the supply of current to the coil 20 of the electromagnet 19 is independent of the potential applied across the coil 8. It will be understood that the operation of this form of the invention is otherwise the same as that of the form shown in Fig. 4. The curves shown in Fig. 6 still apply, although it will be understood that the time $T_a$, at which the current $I_f$ through the coil 20 is initiated, may be made to occur at any time after $T_0$, including some time after $T_2$.

Although there have been herein described certain preferred embodiments of the invention, other embodiments within the scope of the appended claims will be apparent to those skilled in the art from a consideration of the embodiments shown and the teachings hereof. Accordingly, a broad interpretation of the appended claims commensurate with the scope of the invention within the art is desired.

I claim:

1. A welding system comprising: a pair of welding electrodes movable into engagement with the work to be welded, means to apply pressure to said work through said welding electrodes, means to apply a welding current impulse to said work, an electromagnet operable upon one of said electrodes for applying an additional pressure to the work, and means for supplying a unidirectional voltage impulse to said electromagnet in response to said welding current impulse, said electromagnet having an inductance which is high to delay the rise of current therein and delay the application of said additional pressure until after the establishment of current flow through the work.

2. A welding system comprising: a welding load circuit including a pair of welding electrodes movable into engagement with the work to be welded, means to apply pressure to said work through said welding electrodes, means to apply a unidirectional welding current impulse to said work, an electromagnet operable upon one of said electrodes for applying an additional pressure to the work, and means for energizing said electromagnet in parallel with said load circuit, said electromagnet having an inductance which is high relative to the load circuit to delay the rise of current therein and delay the application of said additional pressure until after the establishment of current flow through the work.

3. A welding system comprising: a pair of welding electrodes movable into engagement with the work to be welded, means to apply pressure to said work through said welding electrodes, means to apply a welding current impulse to said work, an electromagnet operable upon one of said electrodes for applying an additional pressure to the work, means for supplying a current impulse to said electromagnet in response to said welding current impulse, and means to delay the application of said electromagnetic current impulse for a predetermined period after the initiation of said welding current impulse to delay the application of said additional pressure until late in the welding current flow.

JOHN W. DAWSON.

REFERENCES CITED

The following references are of record in the file of this patent:

UNITED STATES PATENTS

| Number | Name | Date |
| --- | --- | --- |
| 378,076 | Hagedorn | June 1, 1945 |
| (Alien Property Custodian serial number) | | |
| 1,985,107 | Roth | Dec. 18, 1934 |
| 2,315,916 | Whiteley et al. | Apr. 6, 1943 |
| 2,340,694 | Rogers | Feb. 1, 1944 |
| 2,363,753 | Smith et al. | Nov. 22, 1944 |
| 2,382,711 | Hagedorn | Aug. 14, 1945 |
| 2,401,528 | Vang | June 4, 1946 |